Nov. 2, 1965  E. H. LACEY  3,215,270
POTATO SIZING MACHINE
Filed Nov. 8, 1962  6 Sheets-Sheet 1

Edward H. Lacey
INVENTOR.

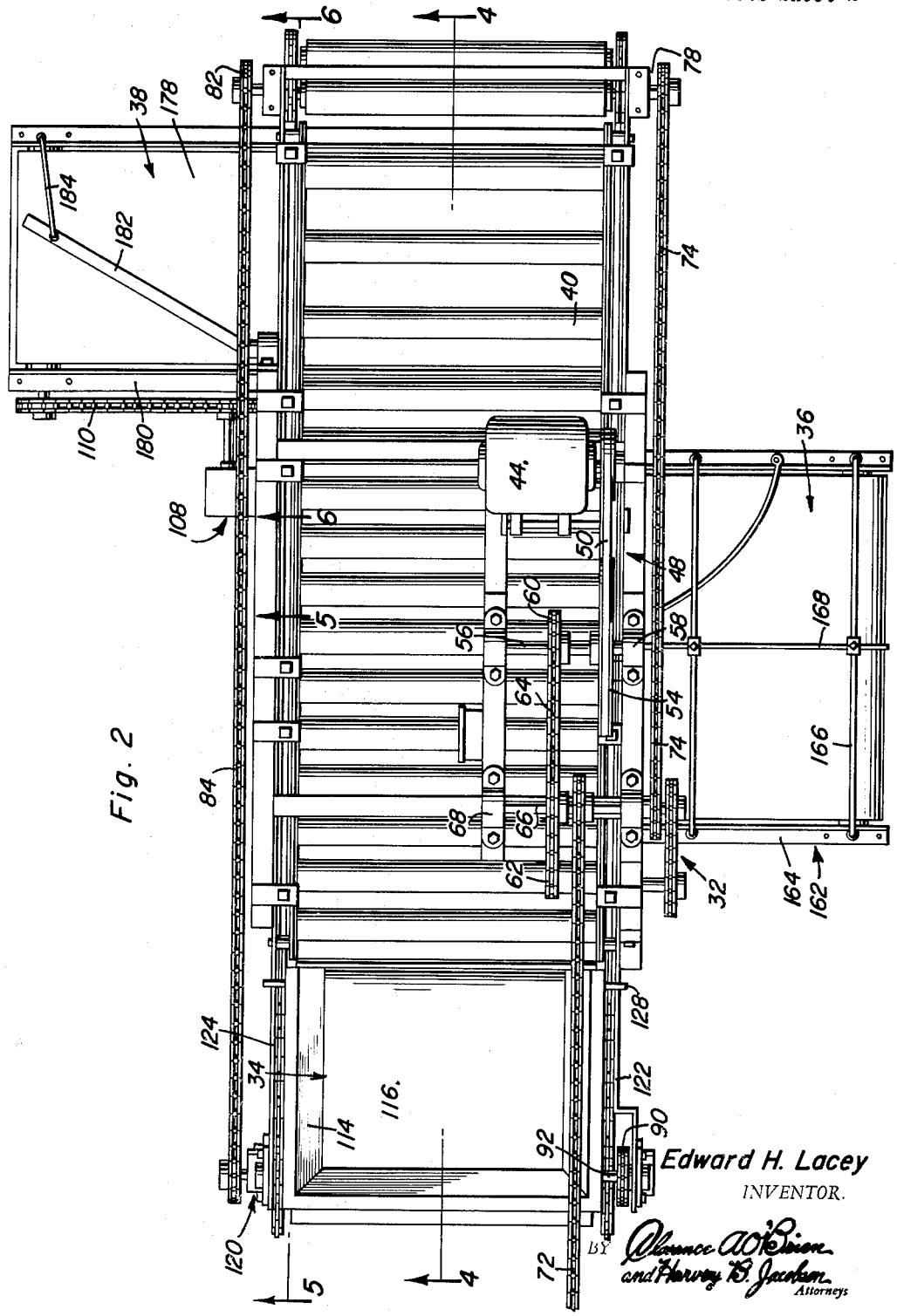

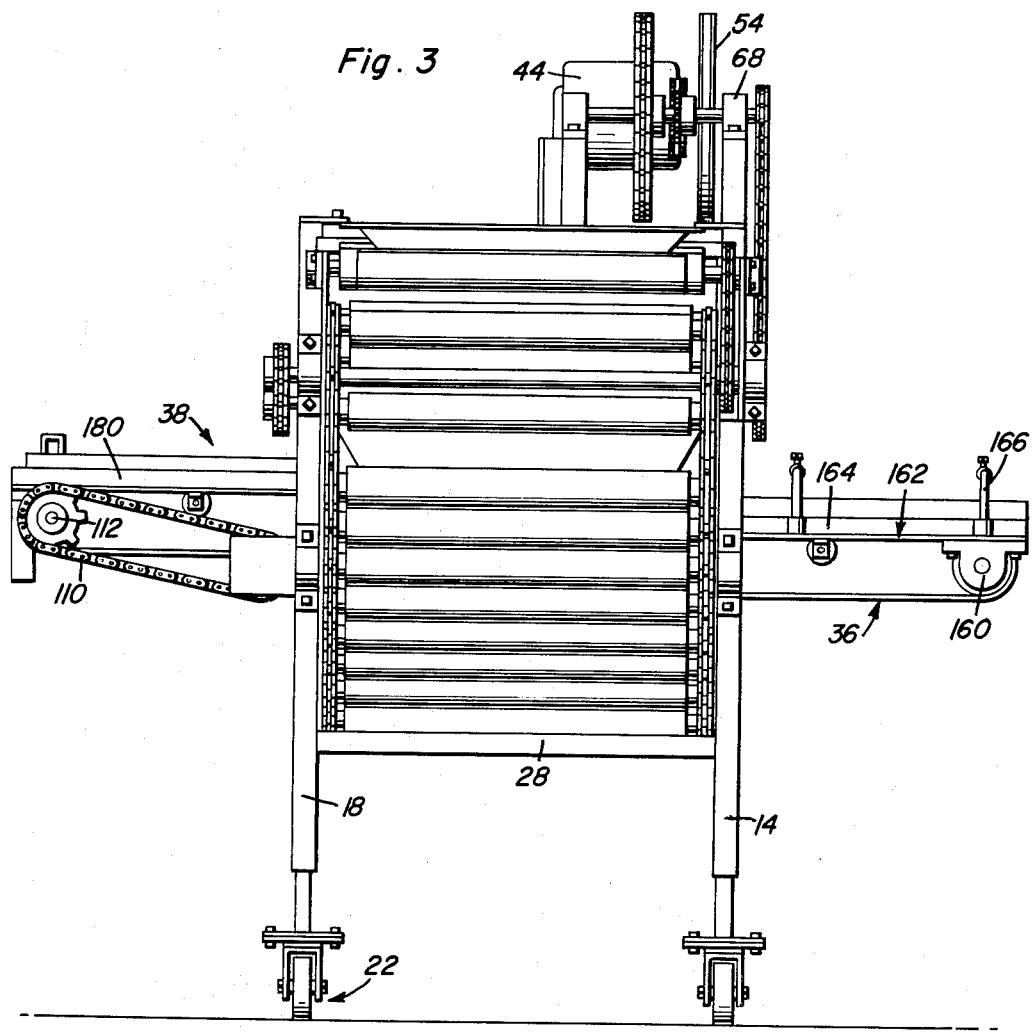
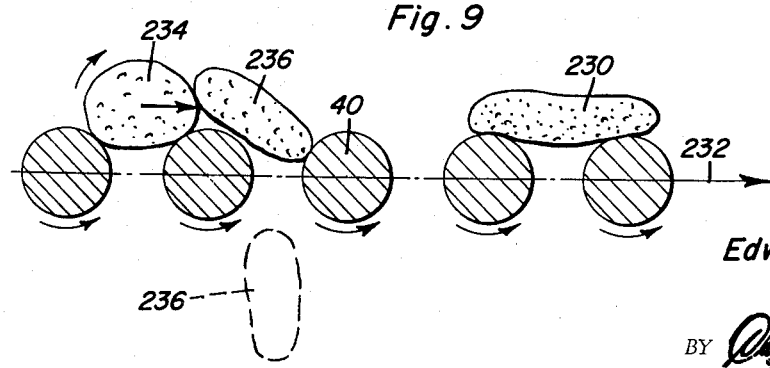

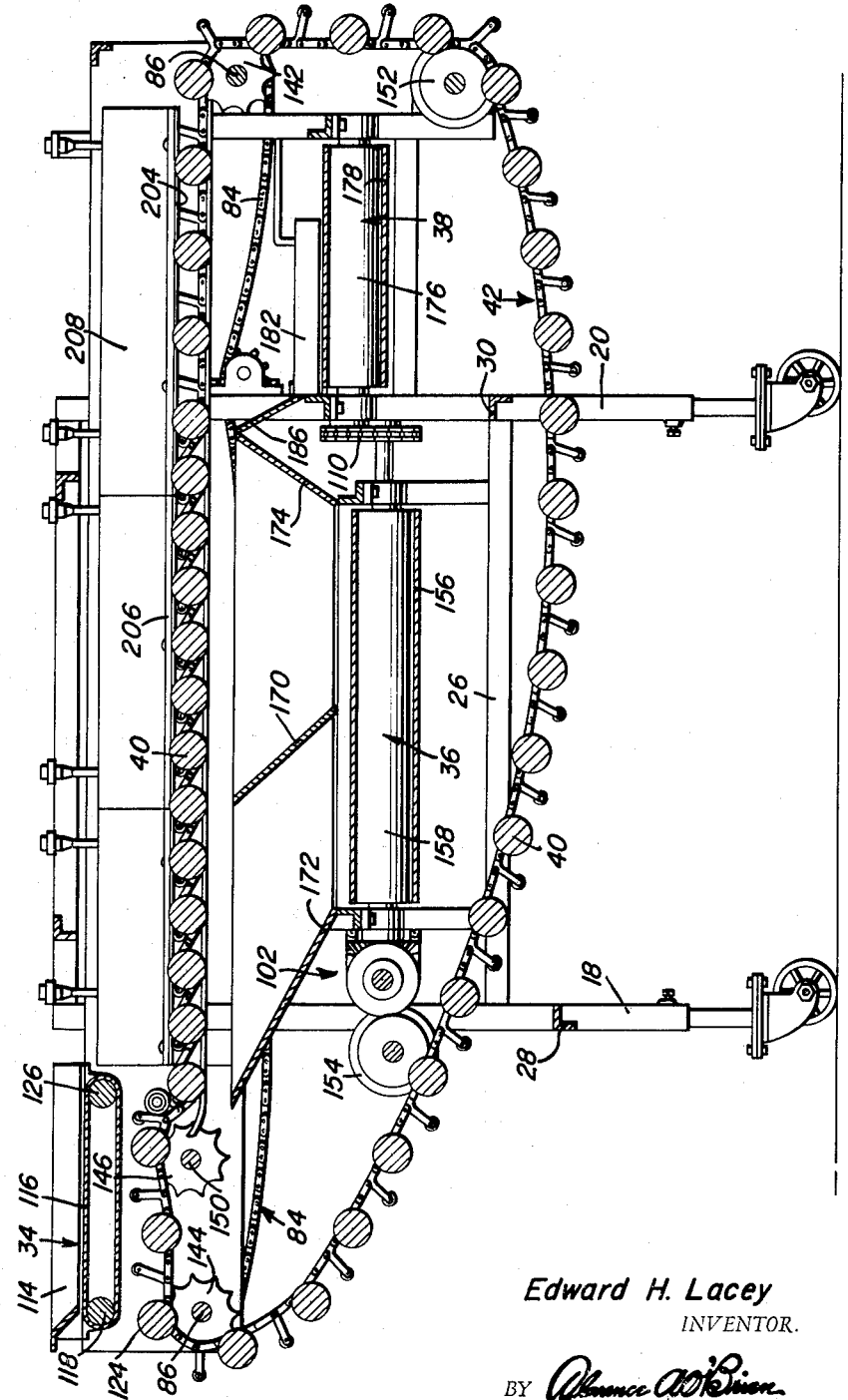

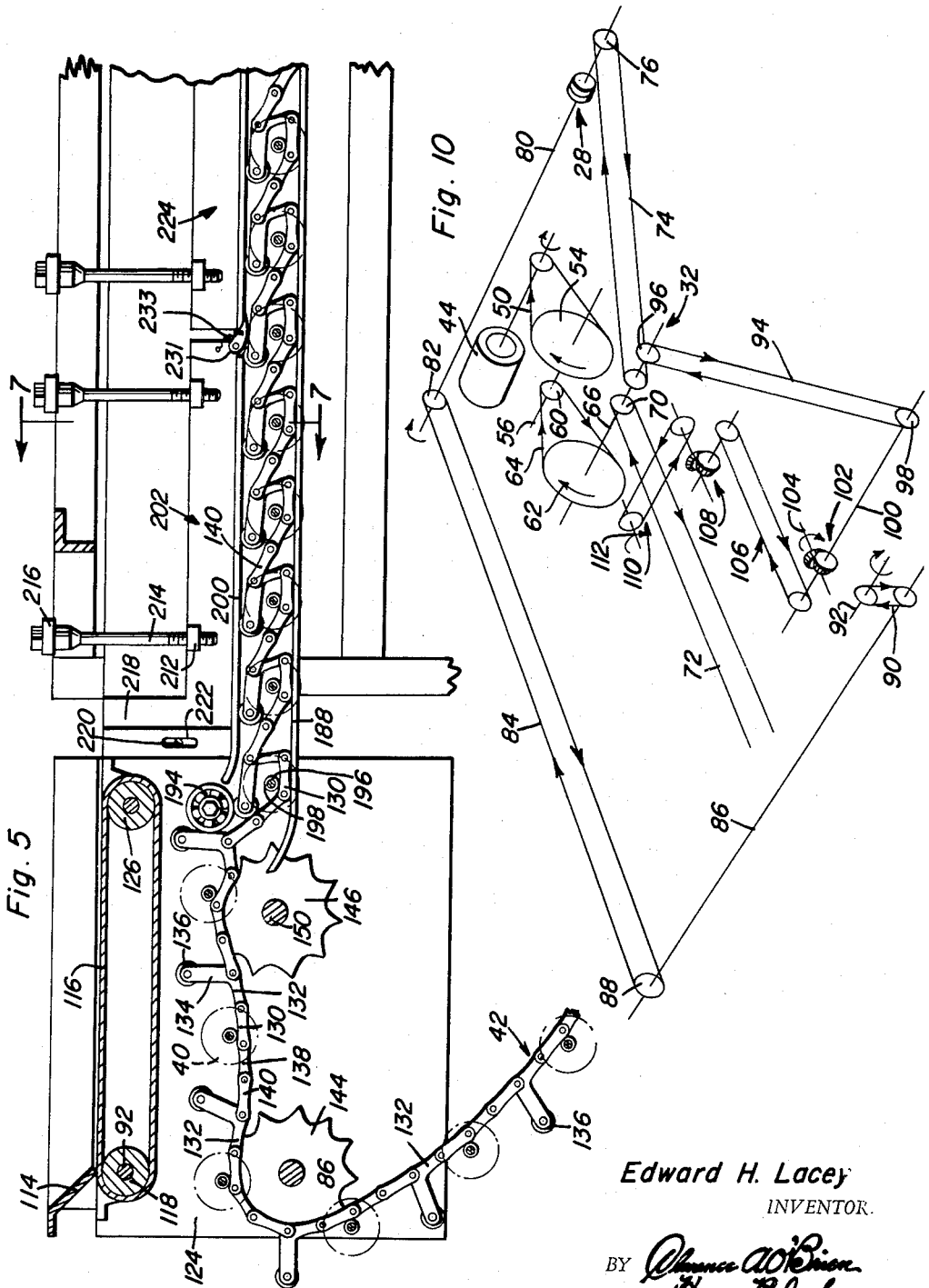

Nov. 2, 1965  E. H. LACEY  3,215,270
POTATO SIZING MACHINE
Filed Nov. 8, 1962  6 Sheets-Sheet 6
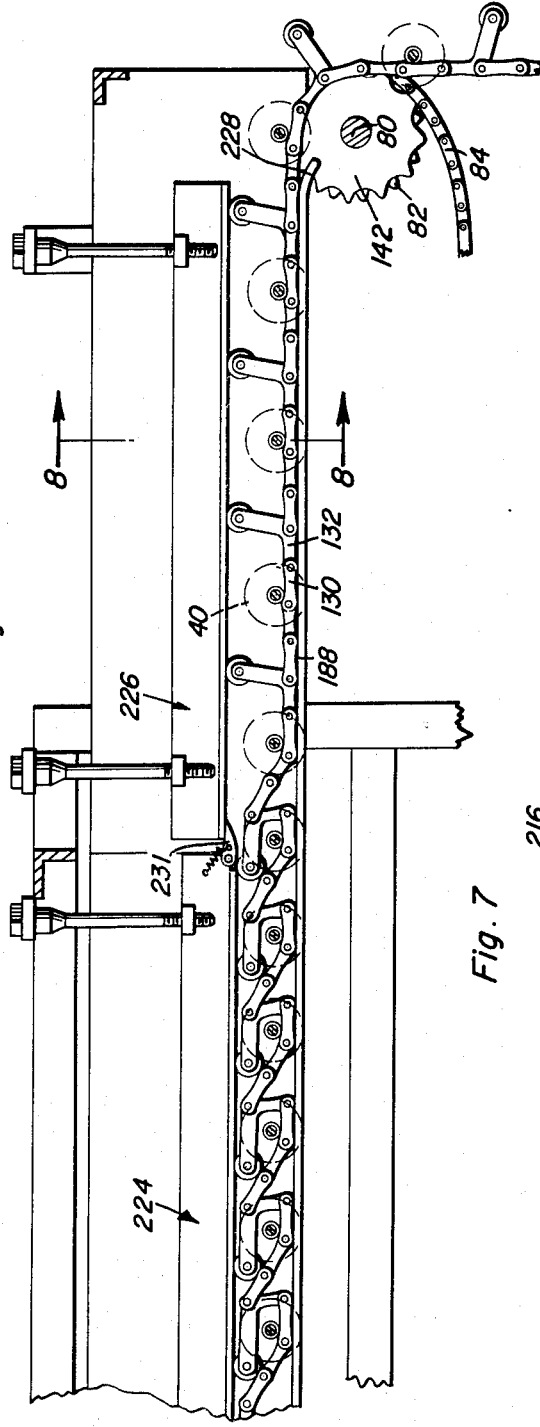
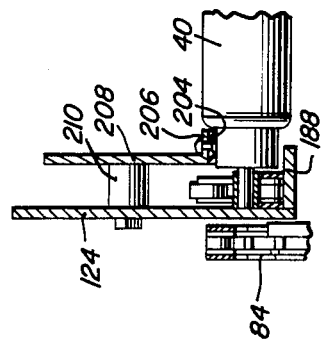
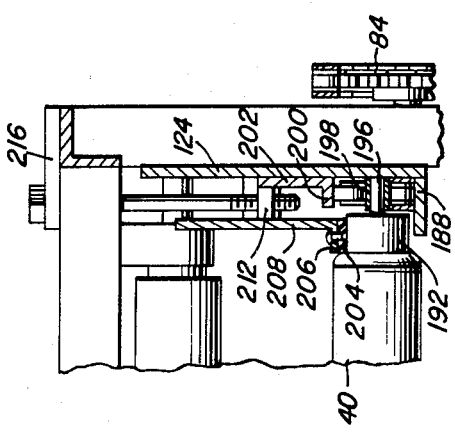
Edward H. Lacey
INVENTOR.

United States Patent Office 3,215,270
Patented Nov. 2, 1965

3,215,270
POTATO SIZING MACHINE
Edward H. Lacey, R.F.D., Trent, S. Dak.
Filed Nov. 8, 1962, Ser. No. 236,296
1 Claim. (Cl. 209—106)

This invention relates to a machine for sorting items according to size and more particularly to the sizing of agricultural crops or produce such as potatoes.

It is a primary object of the present invention to provide a sizing machine for produce such as potatoes which is operative in a new and useful manner to perform the sizing function in a more reliable fashion. Accordingly, the sizing machine of the present invention is capable of sizing articles which vary dimensionally in accordance with their orientation.

Another object of the present invention is to provide a sizing machine having a sizing roller drive which is rendered operative by a roller spacing control to effect conveyance of articles a predetermined distance in accordance with the size of the article with respect to a predetermined orientation thereof.

A further object of the present invention is to provide a size sorting machine embodying a slack control feature for a sizing roller conveyor chain capable of being readily adjusted in order to readjust the sizes with respect to which produce is to be sorted.

An additional object of the present invention is to provide a size sorting machine having a novel driving arrangement for the sizing roller conveying device operative by imparting movement to a conveyor chain having an inactive portion with a predetermined amount of slack in excess of the adjustable amount of slack taken up by the roller spacing control device along the active sizing portion of the machine frame.

In accordance with the foregoing objects, the sizing sorting machine of the present invention involves a plurality of sizing rollers interconnected in equally spaced relation by an endless conveyor chain which includes roller carrying links interconnected with spacing control links having link displacing arms projecting therefrom. The roller conveying chain is entrained about a pair of drive sprockets driven at a constant rate of speed so as to maintain a predetermined amount of slack along an upper run of the endless chain in order to accommodate contraction of the spacing between the rollers carried by the chain along a fixed path of travel. The rollers are active during travel along said fixed path, to control the deposit of articles supported thereabove in accordance with the size of the articles. The rollers during travel along the fixed path, will also be varied in spacing in order to deposit articles of different sizes at different locations. Thus, the link displacing arms of the spacing control links of the endless chain are displaced just prior to entry into the active sizing portion of the machine to fold the chain against the pull exerted thereon. Unfolding of the chain by the tension applied thereto is limited by a preadjusted amount varied along the fixed path of travel by engagement of the link displacing arms with adjustable cam track sections. The pull exerted on the roller conveying chain which tends to unfold the chain, produces a reaction between the link displacing arms and the adjustable cam sections so as to cam the rollers into driving engagement with friction material mounted on a fixed track member whereby rotation is imparted to each of the rollers in a direction so as to be equal and opposite in linear surface speed to the forward movement of the conveyor chain along the fixed path of travel aforementioned. As a result thereof, articles which are so orientated so as to dimensionally exceed the spacing between the roller axes, will be supported above the rollers in a substantially stationary condition or at least conveyed in a forward direction at a substantially reduced linear speed. The articles so supported, will therefore collide with other articles being conveyed forwardly by the rollers, these latter articles being properly orientated so that they do not dimensionally exceed the spacing between the roller axes at the points of contact therewith causing these properly orientated articles to be rotated or tumbled as they are conveyed forwardly. Collision will therefore occur between the properly orientated articles and the others in order to cause reorientation. It will therefore be appreciated in connection with the sizing of produce such as potatoes, that elongated shaped potatoes extending across a plurality of sizing rollers will not be improperly sized in accordance with the maximum dimensions thereof as would be the case with sizing machines heretofore utilized. Further, the sizing machine of the present invention will be easily adjusted and the reorientating function thereof maintained despite the readjustment.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a top plan view of the size sorting machine.

FIGURE 3 is an end elevational view of the machine as viewed from the inlet end thereof.

FIGURE 4 is a longitudinal sectional view of the machine taken substantially through a plane indicated by section line 4—4 in FIGURE 2.

FIGURE 5 is a partial sectional view taken substantially through a plane indicated by section line 5—5 of FIGURE 2.

FIGURE 6 is a partial sectional view taken substantially through a plane indicated by section line 6—6 in FIGURE 2.

FIGURE 7 is a partial sectional view taken substantially through a plane indicated by section line 7—7 in FIGURE 5.

FIGURE 8 is a partial sectional view taken substantially through a plane indicated by section line 8—8 in FIGURE 6.

FIGURE 9 is a diagrammatic illustration of the reorientating action of the size sorting machine.

FIGURE 10 is a diagrammatic illustration of the drive arrangement associated with the size sorting machine.

Figure 1:
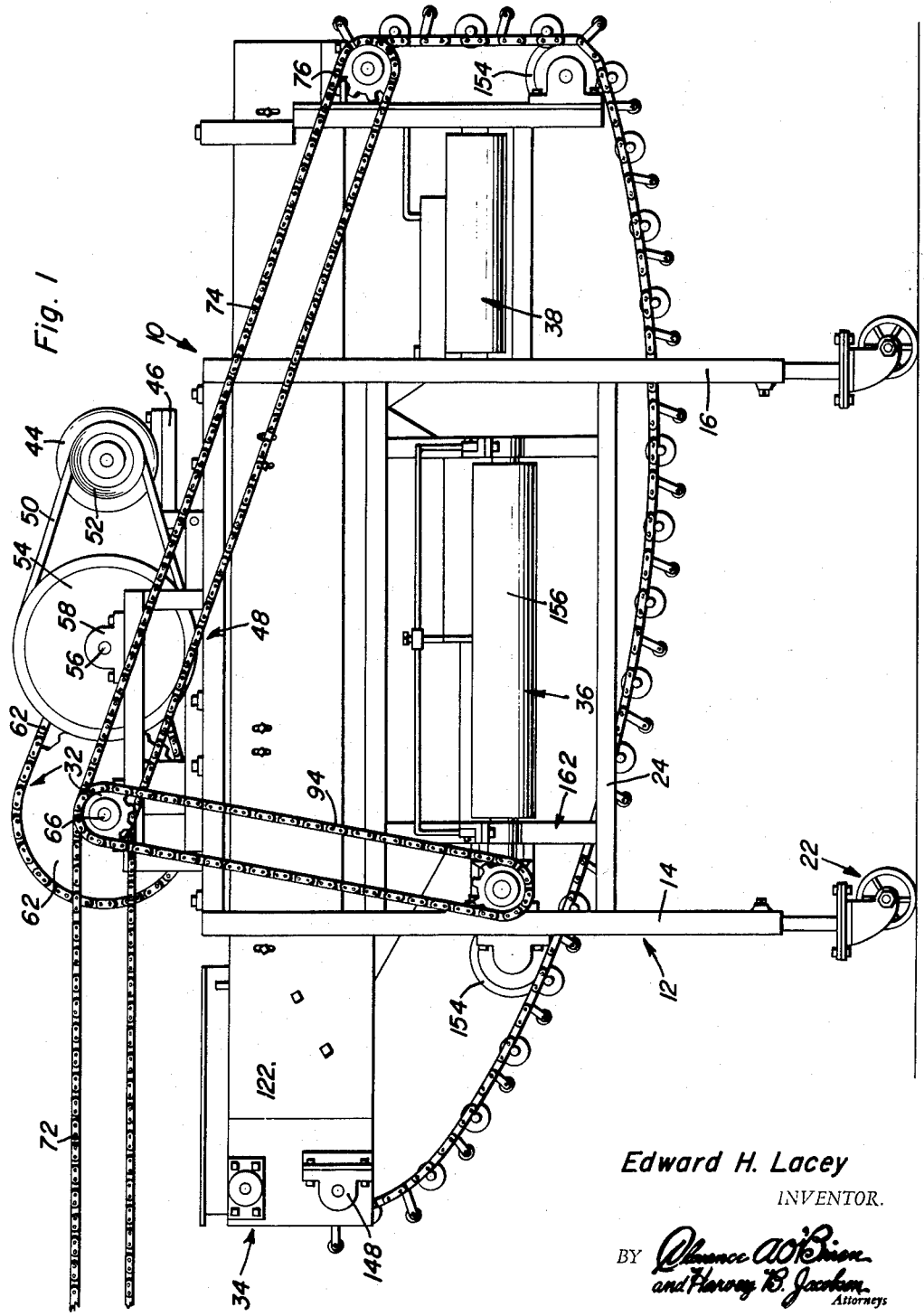
FIGURE 1 is a side elevational view of the size sorting machine of the present invention.

Referring now to the drawing in detail, the size sorting machine may be viewed in its entirety in FIGURES 1, 2 and 3 and is generally referred to by reference numeral 10. The machine 10 includes a mounting frame generally referred to by reference numeral 12 which is adapted to be rendered portable by providing the supporting post members 14, 16, 18 and 20 thereof with caster wheel assemblies 22. The post members are provided with parallel connecting frame members 24 and 26 on opposite sides of the frame assembly and connecting frame members 28 and 30 at opposite ends of the frame assembly as more clearly seen in FIGURE 4. It will be further appreciated, that other interconnecting brace frame members may be utilized in order to form a rigid frame assembly from which all of the component parts of the machine may be supported. The frame assembly thus supports intermediate the opposite ends of the machine on top of the frame assembly and to one side thereof, a transmission section generally referred to by reference numeral 32 from which driving connections are made to a feed-in conveyor section located at the inlet end of the machine and generally referred to by reference numeral 34. Driving connections are also made to the discharge section 36 located intermediate the opposite ends of the machine and projecting laterally from one side thereof, a second discharge section 38 projecting laterally from the opposite side of the machine adjacent the discharge end of the machine as more clearly seen in FIGURE 2. It will therefore become apparent, that produce such as potatoes, of small and intermediate size may be delivered from the discharge section 36 to receiving bins properly located with respect thereto, while the larger sized items may be received within collecting bins located at the discharge section 38. Mounted for movement between the inlet and discharge ends of the machine, are a plurality of sizing rollers 40 carried by a pair of endless rollers carrying chain assemblies 42 as more clearly seen in FIGURE 4, the rollers moving along an upper run thereof, below the feed-in conveyor section 34 toward the opposite end of the machine and then returning along a lower run below the discharge conveyor sections 36 and 38 as more clearly seen in FIGURES 1 and 4.

Referring now to FIGURES 1 and 10 in particular, it will be observed that the drive transmission section 32 is arranged to provide motive power for all of the moving components of the machine. Accordingly, an electric motor 44 is fixedly mounted on a pivot supporting assembly 46 connected to an upper subframe assembly 48 secured to the upper ends of the frame posts 14 and 16 whereby a belt tensioning force is applied to the V-belt 50 which drivingly connects the motor pulley 52 to the drive pulley 54 fixed to a drive shaft 56 journaled between a pair of journal brackets 58 that are mounted on the upper subframe assembly 48. Also fixed to the shaft 56, is a sprocket 60 drivingly connected to a large sprocket wheel 62 by means of the sprocket chain 64. The large sprocket wheel 62 is connected to a drive shaft 66 journaled between the spaced journal brackets 68. Connected to the drive shaft 66, is the sprocket wheel 70 about which a loading elevator drive sprocket chain 72 may be entrained for the purpose of powering any suitable form of elevator or hopper device (not shown) by means of which the produce may be loaded and controllably delivered to the feed-in conveyor section 34 for sizing purposes. Also connected to the drive shaft 66, is a drive sprocket wheel for the roller conveyor drive sprocket chain 74, the driven end of which is entrained about the sprocket wheel 76 associated with a slip clutch device 78 through which the drive shaft 80 is powered for imparting movement to the roller carrying conveyor assembly 42. Connected to the drive shaft 80 on the side of the machine opposite the sprocket wheel 76, is a sprocket wheel 82 arranged to impart movement to an endless driving sprocket chain 84 entrained thereabout which extends substantially the whole length of the machine for imparting movement to a second drive shaft 86 by means of the drive sprocket wheel 88. For reasons to be hereinafter explained, the number of teeth on the drive sprocket wheels 88 and 82 and the relative speeds of the associated drive shafts 86 and 80 are selected so as to impart the same linear speed to the sprocket chain 84. The drive shaft 86 in addition to imparting movement to the roller conveyor 42 at the inlet end of the machine, also is drivingly connected to a sprocket drive 90 for imparting rotation to the feed-in conveyor shaft 92 for the feed-in conveyor section 34. The conveyor mechanism associated with the discharge conveyor sections 36 and 38 on the other hand, are powered by means of the sprocket drive chain 94 which is entrained about the sprocket wheel 96 fixed to the end of the drive shaft 66 and also entrained about the driven sprocket wheel 98 which is connected to the driven shaft 100. The shaft 100 is drivingly connected by the bevel gearing 102 to the conveyor drive shaft 104 of the discharge section 36. The shaft 100 is also drivingly connected by the chain drive 106, the bevel gearing 108 and the chain drive 110 to the conveyor drive shaft 112 of the discharge section 38. Thus, as will be more clearly seen from FIGURE 10, movement will be imparted in the proper direction and speed to the feed-in conveyor section, the discharge sections and at the same rate of speed to the opposite ends of the roller conveyor 42.

The feed-in conveyor section includes a downwardly sloping rim or fence 114 forming three sides disposed above the upper run of a feed-in conveyor belt 116 so as to confine a load of produce such as potatoes delivered to the feed-in conveyor section as herebefore indicated. The feed-in conveyor belt 116 is therefore entrained about a drive roller 118 to which the conveyor shaft 92 is connected, the conveyor shaft being journaled by bearing assemblies 120 mounted on opposite sides of the machine by the frame plate members 122 and 124 secured to the frame post members and extending therebeyond. The other end of the conveyor belt 116 is entrained about the driven roller 126 which is journaled in the fence structure 114 so as to form an assembly which is pivotally displaceable about the conveyor drive shaft 92 in an upward direction and having elements 128 projecting therefrom on opposite sides for resting on top edges of the frame plate members 122 and 124 in order to support the feed-in conveyor section in operative position. In this manner, the feed-in conveyor section 34 may be elevated so as to expose therebelow a portion of the driving arrangement for the roller carrying conveyor 42.

Referring now to FIGURES 4, 5 and 6 in particular, it will be observed that the rollers 40 are rotatably journaled between spaced roller carrying links members 130 in each of the continuous, endless conveyor chain assemblies 42 disposed adjacent the opposite axial ends of the sizing rollers 40. Each of the roller carrying link members 130 has pivotally connected thereto on one side, a spacing control link 132 to which a link displacing arm 134 is connected rotatably mounting on a terminal end thereof, a roller element 136. Pivotally connected to the other end of the roller carrying link 130, are a pair of interconnected links 138 and 140, the link 140 being pivotally connected to an adjacent spacing control link 132. The conveyor chain assemblies 42 so formed are entrained about drive sprockets 142 and 144 respectively fixed to the drive shafts 80 and 86 journaled adjacent the opposite ends of the machine by means of the journal assemblies 148 mounted on the side frame plate members 122 and 124. Thus, the upper run of the conveyor chain assemblies 42 are defined between the drive sprocket wheels 144 and 142, idler sprocket wheels 146 also being drivingly engaged with the upper run of the sprocket chain assemblies 42 by means of the shaft 150. The upper run of the sprocket chain 42 between the idler sprockets 146 and the drive sprockets 144, form a variable slack portion of the conveyor while the upper run portion between the idlers 146 and the drive sprockets 142, define a sizing portion of the conveyor during which the sizing rollers are moved along a fixed path while at the same time their spacing is varied in order to perform the size sorting functions. In order to accommodate the reduction in spacing between the rollers 40 carried on the chain assemblies 42, it is necessary to impart movement to the conveyor chains 42 at opposite ends and at substantially the same rate of speed so as to maintain a predetermined amount of slack in the upper run portion. It is for this reason, that the drive shaft 86 is driven at the proper rate of speed relative to the shaft 80 as hereinbefore mentioned. Thus, initially the proper amount of slack is taken up in order to exert a pull on the chain along the sizing portion of the conveyor chains 42. The lower runs of the conveyor chains 42, are disposed about guide roller assemblies 152 and 154 so as to guide the chains 42 in a slack condition below the discharge sections 36 and 38.

Referring now to FIGURES 1, 4 and 3, it will be observed that the discharge section 36 includes a conveyor belt 156 which is entrained about the drive roller 158 driven by the conveyor drive shaft 104 as described with respect to FIGURE 10 and a driven roller journaled by the journal assemblies 160 mounted on a laterally projecting frame assembly 162. The frame assembly 162 includes as more clearly seen in FIGURE 2, a pair of frame members 164 interconnected by connecting cross members 166 which are connected to and support in suspended relation therebelow, a divider member 168 which is connected to an inclined portion 170 disposed below the sizing rollers of the machine as more clearly seen in FIGURE 4 so as to form with the converging side walls 172 and 174, two compartments for separating potatoes or other items into two different size categories as they are deposited onto the conveyor belt 156 after dropping between the spaced sizing rollers. The discharge section 38 is laterally spaced from the discharge section 36 on the other side of the frame posts 16 and 20 and also includes a drive roller 176 drivingly connected to the conveyor drive shaft 112 as hereinbefore described in connection with FIGURE 10. The conveyor belt 178 is entrained about the drive roller 176 and about a driven roller journaled between a pair of laterally extending frame members 180 as more clearly seen in FIGURES 2 and 3. A discharge guide member 182 is supported between the side plate frame of the machine and the supporting rod member 184 above the upper run of the conveyor belt 178 so that items deposited on the upper run of the conveyor belt by falling between the sizing rollers 40, will be conveyed and guided to a discharge location. A side wall 186 connected to the side wall 174 of the discharge section 36 is therefore also associated with the discharge section 38 beneath the sizing rollers so as to guide falling potatoes or other produce onto either the conveyor belt of the discharge sections 36 or 38, as more clearly seen in FIGURE 4.

In order to guide movement of the sizing rollers 40 in a fixed path along the sizing portion of the roller carrying conveyor chains 42, each of the side frame members are provided with lower track members 188 as more clearly seen in FIGURES 5, 6, 7 and 8. At the inlet end of the track members 188, an upwardly curved portion 190 is formed overlying the idler sprockets 146 so as to guidingly receive the links of the chain 42 and the end roller bearing portions 192 of the sizing rollers 40. Fixedly mounted at the inlet portion as more clearly seen in FIGURE 5, is an abutment roller 194 arranged to engage the link displacing arms 134 so as to cause the chain links to fold downwardly with respect to the roller carrying link members 130 as the chain is displaced generally downwardly on leaving the idler sprockets 146. Thus, the slack in the chains 42 are taken up by the foregoing action which also is operative to reduce the spacing between the roller carrying links 130 so as to reduce to a minimum, the spacing between the sizing rollers 40, the opposite end portions 196 being journaled within the sleeves 198 fixed as by welding to the roller carrying link members 130 as more clearly seen in FIGURE 7. It will be appreciated of course, that once the link displacing arms 134 move past the abutment roller device 194, the pull exerted on the chain by the drive sprocket 142 would tend to unfold the chain from its folded condition. However, after passing the abutment roller device 194, the roller elements 136 connected to the ends of the link displacing arms 134, are engaged by the camming flange 200 which projects from the adjustable cam section member 202 in order to limit upward displacement of the arms 134. Thus, the cam section 202 constitutes a spacing control by means of which the conveyor chain 42 is maintained in a preadjusted folded condition for the purpose of regulating the spacing between the sizing rollers 40 as they are conveyed between the camming flange 200 and the lower track portion 188. It will be appreciated however, that the pulling force applied to the spacing control link 132 by the preceding link 140, produces a reaction force at the point of contact between the roller element 136 and the camming flange 200, so as to apply an upward force component on the axial ends of the sizing rollers 40 whereby the roller bearing portions 192 thereof are cammed into friction engagement with the friction material 204 riveted to the upper track flange 206 of an upper track member 208 which is fixedly spaced with respect to the frame plate members by a plurality of spacer elements 210 as more clearly seen in FIGURE 8. Thus, as the rollers and conveyor chain links move into the trackway formed by the lower track portion 188 and the spacing control cam flange 200, the roller bearing portions 192 of the rollers are drivingly engaged with the upper track member for imparting rotation to the sizing rollers in a direction so that the upper linear surface speed of the rollers will be in a direction opposite to the forward movement of the rollers and at substantially the same speed for reasons to be hereafter explained. Also, by adjusting the spacing between the lower track portion 188, and the camming flange 200, the extent to which the chain may unfold and the corresponding spacing between the rollers may be regulated. Accordingly, a plurality of spaced nut elements 212 are connected to the cam section member 202 for threaded engagement with the adjustment screw members 214 rotatably mounted by screw supporting elements 216 fixed to the frame assembly. In this manner, the height of the cam section 202 may be adjusted. The cam section 202 may be provided if desired, with upwardly projecting calibrating portions 218 and may be locked in adjusted position by means of a locking bolt 220 extending through the adjusting slot 222. Inasmuch as the spacing control cam section 202 is disposed adjacent to the inlet end of the machine, it will be adjusted so as to space the sizing rollers for depositing the smallest size category of items onto the discharge section 36 between the compartment walls 170 and 172 thereof. A similar spacing control cam section 224 is provided adjacent to the previously described cam section 202 and is adjustable in a similar fashion for the purpose of spacing the sizing rollers as they move thereunder, by a progressively increased amount. The deposit of intermediate size items between the rollers is therefore controlled through adjustment of the spacing control section 224. The larger size category of items for maximum control spacing between the sizing rollers 40, may be adjusted by means of the final spacing control section 226 which is similar in function, structure and adjustment to the spacing control sections 202 and 224 hereinbefore described. The sizing rollers 40 thus leave the upper run of the roller carrying conveyor device at the drive sprocket 142 as seen in FIGURE 6, with respect to which the lower track portion 188 overlaps by means of the downwardly curved portion 228 thereof. In order to provide a smooth transition between the differently spaced spacing control sections, the outlet end of the cam control sections 202 and 224, are provided with transition elements 230 having a lower arcuate surface, the elements 230 being pivotally connected to one cam section and bridging the space therebetween for engagement with the cam flange portion of the other cam section. The spring element 233 is provided for the purpose of biasing the elements into contact with the adjacent cam flange.

From the foregoing description, the operation and utility of the size sorting machine of the present invention will be apparent. It will therefore be appreciated, that the items to be sized or sorted according to size, will be deposited onto the feed-in conveyor section 34 with random orientation for delivery to the sizing rollers 40 which move from a variable slack condition below the feed-in conveyor section to the sizing portion of the machine traveling in a fixed path and at a fixed spacing which is progressively increased as the rollers move from the feed-in section to the opposite end of the machine. Thus, by moving in a fixed path, the rollers present spaced supporting surfaces which move in a direction opposite to and at the same linear speed as the forward movement of the sizing roller axes. Referring to FIGURE 9, it will be apparent that an item supported by the sizing rollers such as an elongated russet potato may dimensionally exceed the spacing between the roller axes when orientated as indicated for example by the potato 230 in which case, although the rollers 40 are being moved with respect to their axes in the direction indicated by the arrow 232, the potato 230 will remain stationary since the linear speed of the roller surfaces in contact with the potato are moving in the opposite direction to arrow 232 and at the same velocity. Under such circumstances, the potato 230 although of a dimension in width sufficient for dropping between the rollers 40 as spaced, in FIGURE 9, would not be deposited into the proper discharge section because of the orientation thereof. It is therefore necessary to reorientate the elongated potato 230 so that it would be displaced toward a position parallel to the roller axes. This would occur because of the speed relationship aforementioned, in the machine of the present invention since another potato such as the potato 234 which is properly orientated with respect to its sizing dimension in the direction of movement, would be conveyed forwardly since it contacts adjacent rollers at points thereon causing the potato 234 to rotate therebetween. The potato 234 will therefore collide with any improperly orientated potato such as the potato 236 to thereby reorientate it so that it may drop between adjacent rollers as indicated by dotted lines in FIGURE 9. It will also be appreciated, that the speed relationship aforementioned is achieved by virtue of the reaction to the pull exerted on the conveyor chain carrying the rollers when coacting with the spacing control sections that regulate the spacing between the rollers in a progressively increasing amount.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A size sorting machine for produce or the like comprising, a plurality of rollers having parallel rotational axes and presenting spaced supporting surfaces between which said produce is supported or dropped in accordance with size, conveyor means having a plurality of fixedly interconnected links including equally spaced links rotatably mounting said rollers, drive means operatively connected to said conveyor means for imparting slack movement thereto in one direction along a sizing portion establishing a predetermined amount of slack along an inactive portion of the conveyor means, means operatively engageable with said conveyor means for slack producing displacement of said links in response to said movement of the conveyor means, spacing control means operatively engageable with said links following said displacement thereof to constrain spaced movement of said rollers by holding said links in differently displaced positions along said sizing portion of the conveyor means, and means responsive to movement of said rollers along the sizing portion for imparting linear movement to said spaced supporting surfaces equal in speed to the movement of the rollers but in a direction opposite to said one direction, said slack reducing displacement means comprising a plurality of link displacing arms projecting from some of the links of the conveyor means and in spaced relation between said rollers for folding said links between said rollers, and fixedly mounted abutment means engageable by said displacing arms upon movement of the links into the sizing portion of the conveyor means, said means for imparting linear movement to the spaced supporting surfaces comprising an upper track member disposed above the rollers having frictional material mounted thereon along the sizing portion of the conveyor means to impart rotational movement to the rollers when cammed into frictional drive engagement with the frictional material by forces applied to the conveyor means when reacting against the spacing control means.

References Cited by the Examiner

UNITED STATES PATENTS

| | | | |
|---|---|---|---|
| 2,296,645 | 9/42 | Marsden | 198—183 X |
| 2,786,574 | 3/57 | Clark | 209—107 |
| 2,860,779 | 11/58 | Lindeman | 209—84 |
| 2,917,170 | 12/59 | Flodin | 209—106 |

FOREIGN PATENTS 45,756   4/62   Poland.

M. HENSON WOOD, JR., *Primary Examiner.*

ROBERT B. REEVES, SAMUEL F. COLEMAN,
*Examiners.*